United States Patent
Baessler et al.

(10) Patent No.: US 9,542,563 B2
(45) Date of Patent: Jan. 10, 2017

(54) ACCESSING PROTECTED CONTENT FOR ARCHIVING

(71) Applicant: GLOBALFOUNDRIES Inc., Grand Cayman (KY)

(72) Inventors: Michael Baessler, Neckartenzlingen (DE); Philipp Hoffmann, Weil im Schonbuch (DE); Markus Lorch, Dettenhausen (DE); Juergen Maletz, Wildberg (DE); Daniel Pittner, Steinenbronn (DE); Dirk Seider, Grosselfingen (DE)

(73) Assignee: GLOBALFOUNDRIES INC., Grand Cayman (KY)

( * ) Notice: Subject to any disclaimer, the term of this patent is extended or adjusted under 35 U.S.C. 154(b) by 41 days.

(21) Appl. No.: 14/062,035

(22) Filed: Oct. 24, 2013

(65) Prior Publication Data
US 2015/0121446 A1   Apr. 30, 2015

(51) Int. Cl.
G06F 21/00 (2013.01)
G06F 21/62 (2013.01)
H04L 29/06 (2006.01)

(52) U.S. Cl.
CPC .............. *G06F 21/62* (2013.01); *H04L 63/10* (2013.01)

(58) Field of Classification Search
None
See application file for complete search history.

(56) References Cited

U.S. PATENT DOCUMENTS

| 6,044,155 A * | 3/2000 | Thomlinson | G06F 21/6245 380/277 |
| 7,373,330 B1 | 5/2008 | Klebe | |
| 7,614,077 B2 * | 11/2009 | Brew | G06F 21/10 380/281 |

(Continued)

FOREIGN PATENT DOCUMENTS

| CN | 102694796 | 9/2012 |
| WO | 2012016091 | 2/2012 |

OTHER PUBLICATIONS

IBM, "A method to encrypt/decrypt data", http://ip.com/IPCOM/000181374, IP.com Prior Art Database Technical Disclosure, IP.com IPCOM000181374D, Mar. 31, 2009, pp. 1-3.
(Continued)

*Primary Examiner* — Lisa Lewis
*Assistant Examiner* — Maung Lwin
(74) *Attorney, Agent, or Firm* — DeLio, Peterson & Curcio, LLC; Kelly M. Nowak

(57) ABSTRACT

According to one embodiment of the present invention, a system for accessing protected content includes a first computing device with at least one processor. The system determines one or more users associated with information required to access content of a protected document based on a set of rules. A request is generated and sent to at least one second computing device associated with the one or more determined users to retrieve and utilize the required information to access the content of the protected document. Embodiments of the present invention further include a method and computer program product for accessing protected content in substantially the same manner described above.

20 Claims, 4 Drawing Sheets

(56) References Cited

U.S. PATENT DOCUMENTS

| | | | |
|---|---|---|---|
| 7,644,443 B2* | 1/2010 | Matsuyama | G06F 21/10 726/27 |
| 7,801,871 B2 | 9/2010 | Gosnell | |
| 8,086,635 B1* | 12/2011 | Rinker | G06F 21/604 707/783 |
| 8,261,320 B1 | 9/2012 | Serenyi et al. | |
| 8,302,162 B1* | 10/2012 | Sridharan | 726/3 |
| 8,341,427 B2 | 12/2012 | Auradkar et al. | |
| 8,396,838 B2 | 3/2013 | Brockway et al. | |
| 8,504,830 B2* | 8/2013 | Ishii | G06F 11/1453 380/229 |
| 2002/0032742 A1* | 3/2002 | Anderson | H04L 12/587 709/206 |
| 2003/0149884 A1* | 8/2003 | Hernandez | G06F 21/10 713/193 |
| 2008/0016127 A1* | 1/2008 | Field | 707/202 |
| 2008/0123854 A1 | 5/2008 | Peel et al. | |
| 2008/0229037 A1* | 9/2008 | Bunte | G06F 11/1451 711/162 |
| 2008/0235005 A1* | 9/2008 | Golan | H04L 67/306 704/9 |
| 2009/0097662 A1 | 4/2009 | Olechowski et al. | |
| 2009/0214044 A1* | 8/2009 | Kinoshita | 380/283 |
| 2010/0250931 A1 | 9/2010 | Anderson et al. | |
| 2011/0093471 A1* | 4/2011 | Brockway | G06F 17/30616 707/747 |
| 2012/0036370 A1* | 2/2012 | Lim et al. | 713/189 |
| 2012/0233130 A1* | 9/2012 | Vedachalam | G06Q 10/107 707/673 |
| 2013/0018963 A1* | 1/2013 | Brauff et al. | 709/206 |
| 2013/0080301 A1* | 3/2013 | Siauw | G06Q 40/02 705/30 |
| 2013/0159021 A1* | 6/2013 | Felsher | G06F 19/322 705/3 |
| 2013/0160075 A1* | 6/2013 | Schlesinger | G06F 21/6218 726/1 |
| 2013/0167222 A1* | 6/2013 | Lewis | 726/17 |
| 2013/0174272 A1* | 7/2013 | Chevalier | G06F 21/10 726/28 |

OTHER PUBLICATIONS

Greenan, K. et al., "POTSHARDS: Storing Data for the Long-term Without Encryption", http://www.ssrc.ucsc.edu/pub/storer05-sisw.html, Proceedings of the 3rd International IEEE Security in Storage Workshop, Dec. 2005, 9 pages.

Ghafoor, A. et al., "CryptoNET: Design and Implementation of the Secure Email System", IEEE Xplore Digital Library, http://ieeexplore.ieee.org/xpls/abs_all.jsp?arnumber=5683054&tag=1, Security and Communication Networks (IWSCN), Proceedings of the 1st International Workshop, May 2009, pp. 1-6.

"How to open password protected powerpoint (.ppt) files from the Microsoft office interop in C#/.net 4.0", http://social.msdn.microsoft.com/Forums/en-US/1225c879-a36f-4abf-afcd-026d55bb9cd0/how-to-open-password-protected-powerpoint-ppt-files-from-the-microsoft-office-interop-in-cnet, Microsoft Forum, accessed Oct. 22, 2013, 2 pages.

Nash, Mike, "Microsoft RMS—A Step Forward in Secure Information Delivery", http://technet.microsoft.com/en-us/library/dd277361.aspx, Microsoft, Dec. 1, 2003, pp. 1-3.

"A method to encrypt/decrypt data", http://ip.com/IPCOM/000181374, The IP.com Prior Art Database Disclosure, IP.com IPCOM000181374D, Mar. 31, 2009, 1 page.

"Voltage SecureMail eDiscovery and Archiving Support", http://157.238.212.45/products/ediscovery_archive.htm, copyright 2003-2013 Voltage Security, Inc., 2 pages.

Greenan, K. et al., "Potshards: storing data for the long-term without encryption", IEEE Xplore Digital Library, http://ieeexplore.ieee.org/xpl/articleDetails.jsp?tp=&arnumber=1628478&contentType=Conference+Publications&searchWithin%3DArchival+Storage+System+20%26queryText%3DEncrypted+Data, Security in Storage Workshop, Dec. 2005, 2 pages.

Ghafoor, A. et al., "CryptoNET: Design and implementation of the Secure Email System", IEEE Xplore Digital Library, http://ieeexplore.ieee.org/xpl/articleDetails.jsp?tp=&arnumber=5683054&contentType=Conference+Publications&searchWithin%3Darchive%26queryText%3DEncrypted+Messages, Security and Communication Networks (IWSCN), May 2009, 1 page.

* cited by examiner

ACCESSING PROTECTED CONTENT FOR ARCHIVING

BACKGROUND

1. Technical Field

Present invention embodiments relate to archiving content, and more specifically, to accessing protected content (e.g., password protection, encryption or encoding, access restrictions, etc.) in order to archive that content.

2. Discussion of the Related Art

Compliance archiving is the process of capturing corporate data, such as electronic mail (e-mail) messages or files, from a shared file system or user workstation. This data may later serve as evidence in legal cases. A full-text search index is typically created over the archived data to enable content searches to be performed based on keywords. The content searches require that text content of the data be accessible by an archive system.

In the case of compliance archiving for e-mail messages, a mechanism referred to as e-mail journaling is frequently used in which e-mail systems of the corporation create a copy of every e-mail message that is sent or received across a corporate network in order to archive these messages. However, the e-mail message sent by a user may be encrypted with the sender's and/or the recipient's credentials. Thus, no systems other than the e-mail system have appropriate credentials to decrypt the e-mail contents. Accordingly, the journal copy of the e-mail message is encrypted and cannot be used for compliance content searches since the contents of an encrypted e-mail message cannot be parsed and added to the full text index, nor can such an e-mail message be restored and read by anybody other than the designated recipients or sender. If the recipients or sender are no longer employees of the corporation, it may be impossible to access the content of the encrypted e-mail message.

Although a policy may be provided in which a corporate user account is always given appropriate access credentials to every e-mail message that is encrypted by a corporate e-mail system, implementation of such policies is difficult and may not always be possible.

In the case of performing archiving for legal compliance and discovery, content of encrypted documents cannot be text indexed for searching purposes and, therefore, this content cannot be searched and found easily. These documents can be of various kinds of document types that have been encrypted by the document originator or owner (e.g., text documents, spread sheets, archive files such as .zip files, etc.). In most cases, the only way to get access to content of encrypted documents is by requesting the originator or owner of the document to provide a decrypted version or a decryption key.

In a compliance archiving scenario, a significant compliance risk occurs when asking a user for a decrypted version of a document. This results from the possibility that the content of the provided decrypted document does not reflect the content of the original encrypted version. In order to verify the content of the decrypted document, as digital signature over the original content would have to be generated before that content was encrypted. However, the generation of the digital signature does not occur for most applications and cannot be generated once the content has been encrypted.

Although automatic or manual decryption of a document may be employed, the automatic decryption is limited to specific kinds of encryption and applications, while manual decryption (e.g., requesting users to manually remove encryption) cannot guarantee integrity of the decrypted document.

BRIEF SUMMARY

According to one embodiment of the present invention, a system for accessing protected content includes a first computing device with at least one processor. The system determines one or more users associated with information required to access content of a protected document based on a set of rules. A request is generated and sent to at least one second computing device associated with the one or more determined users to retrieve and utilize the required information to access the content of the protected document. Embodiments of the present invention further include a method and computer program product for accessing protected content in substantially the same manner described above.

BRIEF DESCRIPTION OF THE SEVERAL VIEWS OF THE DRAWINGS

Generally, like reference numerals in the various figures are utilized to designate like components.

DETAILED DESCRIPTION

Present invention embodiments enable corporations, companies, organizations, or other entities to transparently decrypt encrypted e-mail messages by leveraging end-user credentials available on an end-user e-mail client application. Alternatively, the end-user can be asked for permission to enable the e-mail client application to decrypt the encrypted e-mail message or other encrypted content on a case-by-case basis.

Present invention embodiments may further provide access to files and other content that is discovered as protected content (e.g., password protected, encrypted or encoded, access restrictions, etc.) in an enterprise during archiving or other operations. The owner or originator of the protected content (e.g., password protected, encrypted or encoded, access restrictions, etc.) is identified, and a request is sent to the owner or originator to provide the content to be archived.

Thus, present invention embodiments enable access to protected content (e.g., password protected, encrypted or encoded, access restrictions, etc.) without having information required to access the content (e.g., passwords, decryption keys, etc.).

Figure 1:
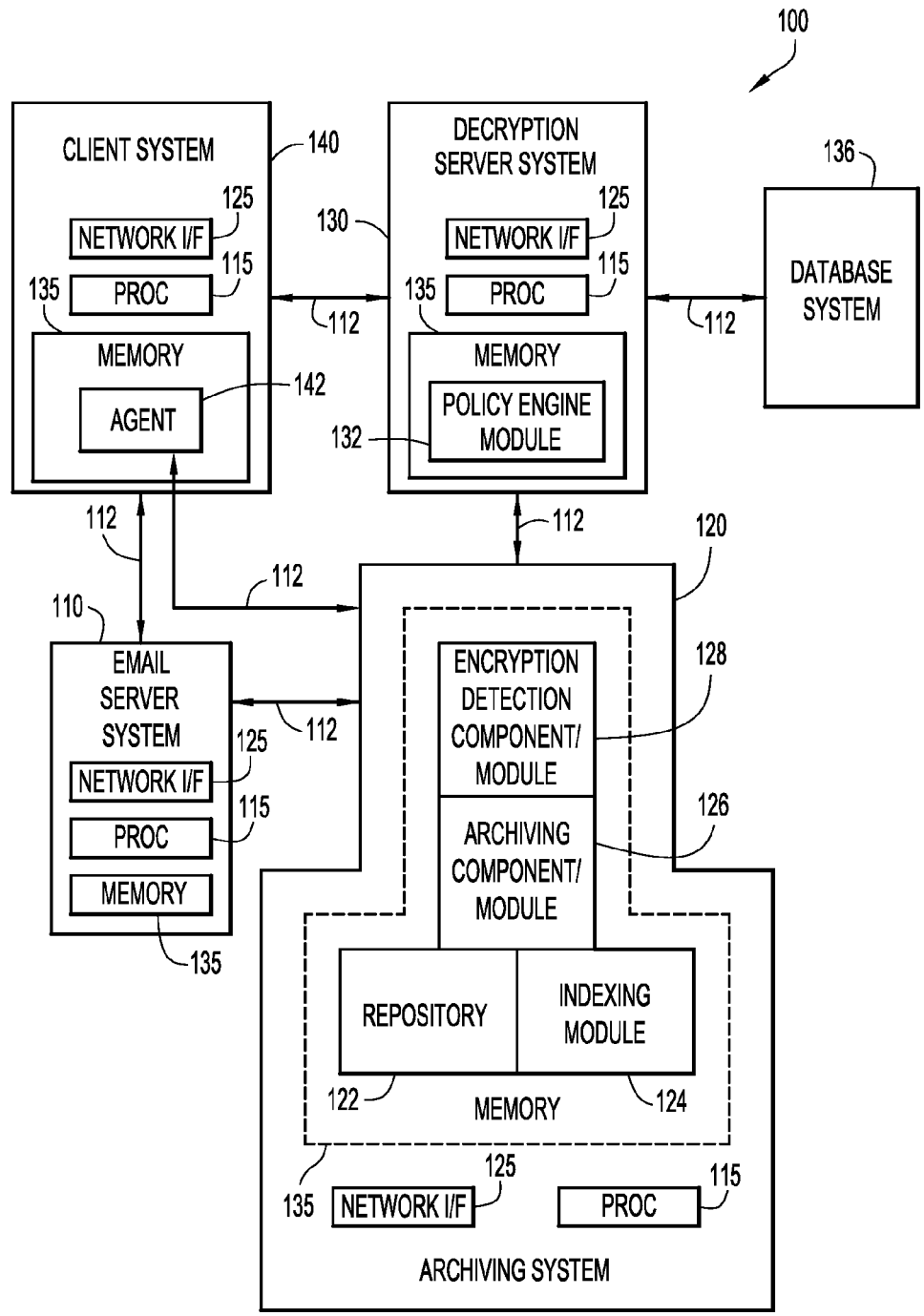
FIG. 1 is a diagrammatic illustration of an example computing environment of an embodiment of the present invention for archiving encrypted e-mail messages.

An example computing environment for a present invention embodiment that decrypts encrypted e-mail messages for archiving is illustrated in FIG. 1. Specifically, computing environment 100 includes an e-mail server system 110, an archiving system 120, a decryption server system 130, and one or more client or end-user systems 140. Server systems 110, 130, archiving system 120, and client systems 140 may be remote from each other and communicate over connections of a network 112. The network may be implemented by any number of any suitable communications media (e.g., wide area network (WAN), local area network (LAN), Internet, Intranet, etc.). Alternatively, server systems 110, 130, archiving system 120, and client systems 140 may be local to each other, and communicate via any appropriate local communication medium (e.g., local area network (LAN), hardwire, wireless link, Intranet, etc.).

E-mail server system 110 may be implemented by any conventional or other electronic mail server and (e.g., along with an e-mail client application) provides an e-mail system that enables users to send and receive e-mail messages. Archiving system 120 archives or stores the e-mail messages sent and received via e-mail server system 110. The e-mail server system may employ e-mail journaling, where copies of the e-mail messages are provided in order to be archived. The archiving system includes a repository 122 to store the e-mail messages, an indexing module 124 to generate an index for the stored e-mail messages to perform searching, an archiving component or module 126 to control archiving of the e-mail messages in repository 122, and an encryption detection component or module 128 to determine the presence of encrypted e-mail messages. Repository 122 may be implemented by any conventional or other database or storage unit, may be local to or remote from archiving system 120, and may communicate via any appropriate communication medium (e.g., local area network (LAN), wide area network (WAN), Internet, hardwire, wireless link, Intranet, etc.).

Decryption server system 130 includes a policy engine module 132 to determine users to receive a request for decrypting an encrypted e-mail message detected by archiving system 120. The decryption server system further sends the request to client systems 140 of the determined users to facilitate decryption of the encrypted e-mail message. A database system 136 may store various information for the determination (e.g., rules, constraints, additional information (e.g., directories, organizational charts, etc.)). The database system may be implemented by any conventional or other database or storage unit, may be local to or remote from decryption server system 130, and may communicate via any appropriate communication medium (e.g., local area network (LAN), wide area network (WAN), Internet, hardwire, wireless link, Intranet, etc.).

Client systems 140 may present a graphical user (e.g., GUI, etc.) or other interface (e.g., command line prompts, menu screens, etc.) to solicit information from users pertaining to reception and transmission of e-mail messages (e.g., creating, editing, deleting, moving, storing, archiving, sending, receiving, displaying, etc.). The client systems include an agent module 142 (preferably within an e-mail client application) that receives the decryption request from decryption server 130 and prompts a user for permission to enable the agent module to decrypt the encrypted e-mail message based on user credentials within the e-mail system. Alternatively, the encrypted e-mail message may automatically be decrypted (without prompting the user) by the agent module based on various criteria (e.g., configurable rules or policies, parameters, etc.). Once the encrypted e-mail message is decrypted, the agent module sends the decrypted e-mail message to archiving system 120 for archiving.

Server systems 110, 130, archiving system 120, and client systems 140 may be implemented by any conventional or other computer systems preferably equipped with a display or monitor, a base (e.g., including at least one processor 115, one or more memories 135 and/or internal or external network interfaces or communications devices 125 (e.g., modem, network cards, etc.)), optional input devices (e.g., a keyboard, mouse or other input device), and any commercially available and custom software (e.g., server/communications software, browser/interface software, agent module, policy engine module, encryption detection component or module, archiving component or module, indexing module, etc.).

The modules (e.g., agent module, policy engine module, encryption detection component or module, archiving component or module, indexing module, etc.) of computing environment 100 may include one or more modules or units to perform the various functions of present invention embodiments described below. These various modules (e.g., agent module, policy engine module, encryption detection component or module, archiving component or module, indexing module, etc.) may be implemented by any combination of any quantity of software and/or hardware modules or units, and may reside within memory 135 of the server, archiving and/or client systems for execution by corresponding processor 115.

Figure 2:
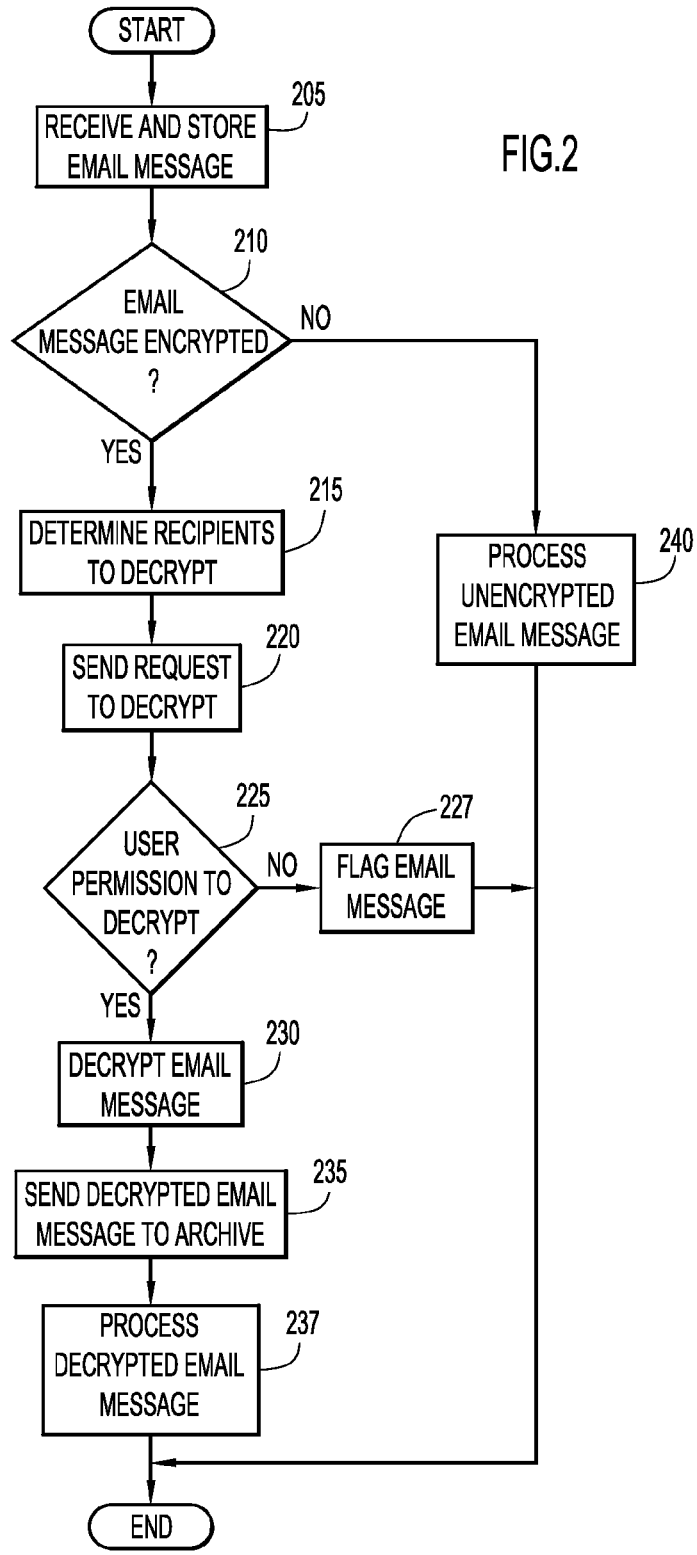
FIG. 2 is a procedural flow chart illustrating a manner of decrypting an encrypted e-mail message for archiving content of that e-mail message according to an embodiment of the present invention.

A manner of archiving encrypted e-mail messages (e.g., via archiving system 120, decryption server system 130, and client systems 140 and their corresponding modules) is illustrated in FIG. 2. Specifically, an e-mail message from e-mail server system 110 is received by archiving system 120 at step 205. The e-mail server system may perform e-mail journaling to create copies of e-mail messages to be archived. The archiving system archives or stores (e.g., via archiving component 126) the received e-mail message in repository 122 (e.g., regardless of the presence of encryption). This enables an encrypted e-mail message to be stored in an encrypted original form (e.g., this occurs as part of the archiving transaction) to ensure that the original e-mail message is always archived successfully in its entirety. The encrypted e-mail message may be searched based on metadata (e.g., the sender or recipient information) provided by the e-mail server system in unencrypted form.

Encryption detection component 128 of archiving system 120 examines the received e-mail message for encryption at step 210. For example, e-mail server system 110 may set a flag within an e-mail message to indicate that the e-mail message is encrypted. The encryption detection component examines the state of this flag within the received e-mail message to determine the presence of encryption. When the e-mail message is not encrypted, the unencrypted e-mail message is processed and indexed by the archiving system (e.g., via indexing component 124 and/or archiving component 126) at step 240 to enable keyword or content searching of the e-mail message.

If the e-mail message is encrypted as determined at step 210, a request is sent from encryption detection component 128 of archiving system 120 to decryption server system 130 to determine one or more users able to decrypt the encrypted e-mail message at step 215. The request may include various information pertaining to the e-mail message (e.g., sender, recipients, sender and recipient mail boxes on the e-mail server system, etc.). Policy engine module 132 of the decryption server system determines the users to decrypt the e-mail message in response to the request. The policy engine module may utilize rules, statistics and/or external data sources (e.g., a directory service, etc.) to determine a strategy to use for generating decryption requests that are sent to specific users. For example, a decryption request may be sent to the sender and/or all recipients of the e-mail message. Alternatively, various constraints or rules may be employed to determine the users to receive the decryption requests. By way of example, the constraints or rules may include: sending one decryption request in order to minimize the impact on end-users; excluding external users (e.g., users external of an entity (e.g., corporation, company, organization, etc.)) from the decryption process; distributing decryption requests across available users (e.g., considering all decryption requests that have been generated); excluding users which are unavailable (e.g., due to vacation, sickness or other configurable reason according to their calendar) from the decryption process; generating another decryption request for a different user when the initial user does not respond to a decryption request within a certain time interval (e.g., days, etc.); based on the entity, one or more users are chosen from a remaining list; select users from different entity departments or groups or with the greatest hierarchical distance within the entity organization (e.g., this maximizes the chance that fraud can be detected when inconsistent responses to the decryption request are returned since it is unlikely that users are aware of the request and can synchronize on fake responses); and in the case of a manual decryption of an attachment (e.g., provide an uncompressed version of a zip file attachment which is password protected), proceed until a certain number (e.g., three or more, etc.) responses have been retrieved.

Once the users to receive the decryption request have been determined, the decryption request is generated and sent from decryption server system 130 to client systems 140 of the determined users at step 220. The decryption request may include various information pertaining to decryption of the e-mail message (e.g., information pertaining to the user for accessing user credentials, time stamp, message identifier, etc.). In order to ensure that the e-mail message is decrypted even if a particular user is not available (e.g. the user is out of the office, the e-mail client application is not reachable, etc.), the decryption request can be sent to plural users serially or in parallel (e.g., the sender and all recipients of the e-mail message that are members of the e-mail system of an entity), and one or more of the client systems may be required to respond to the decryption request as described below.

Agent module 142 of client systems 140 receives and processes the decryption request, and preferably executes on the client systems as part of a standard e-mail client application associated with e-mail server system 110. When the agent module receives the decryption request, the agent module checks for user permission to decrypt the encrypted e-mail message at step 225. For example, the agent module may prompt the user via a user interface (e.g., GUI, menu, line prompt, etc.) to request permission to decrypt the encrypted e-mail message. If permission for decryption is denied as determined at step 225, archiving system 120 is notified and flags (e.g., via archiving component 126) the e-mail message in the archive (or repository 122) (e.g., with a flag indicating that the decryption was denied by a user) at step 227. This may allow for additional processing (e.g., resend the decryption request, determine other users who may provide permission, etc.).

Once permission for decryption is obtained, the agent module retrieves the encrypted e-mail message from the e-mail system (e.g., via the message identifier) and decrypts that message using the end-user credentials of the e-mail system at step 230. Alternatively, the user may configure the agent module, or set a parameter, to automatically and transparently decrypt the encrypted e-mail message (without a user prompt) using the end-user credentials.

Once the encrypted e-mail message is decrypted, the agent module subsequently sends the decrypted e-mail message to archiving system 120 at step 235. In order to protect the decrypted content, the agent module may encrypt the decrypted content based on credentials of the archiving system. In this case, the archiving system utilizes the credentials to decrypt the encrypted content to retrieve the decrypted e-mail message contents.

The archiving system processes and archives the decrypted content of the encrypted e-mail message (e.g., via indexing component 124 and/or archiving component 126) at step 237. The decryption request can be sent to a single user for a response (e.g., decrypted e-mail message) from the client system, or to a plurality of users serially or in parallel, where one or more of the client systems associated with the plurality of users may be required to respond to the decryption request. In the case of plural users receiving the decryption request, a first received response may be sufficient to provide the decrypted e-mail message. Alternatively, the decrypted e-mail message from client systems associated with two or more of the plural users may be compared to verify the decryption, where the decrypted e-mail message may be selected from the version provided by any quantity of the plural users (e.g., a majority, at least a certain quantity, etc.). If a decryption request is not responded to from a sufficient quantity of the contacted client systems during a configurable time period (or the decrypted e-mail message cannot be verified), the e-mail message may be flagged in the archive (or repository 122) with a corresponding status flag in order to allow for additional processing (e.g., resend the decryption request, determine other users, etc.).

Once the decrypted e-mail message is received, the archiving system is responsible for, and has to ensure the security of the decrypted content. Accordingly, the archiving system may encrypt the decrypted content with its own security mechanism via any conventional or other encryption/decryption techniques). Further, an implicit or explicit link between the archived encrypted and decrypted e-mail messages is established in the archiving system. In order to enable content searches for encrypted e-mail messages, the decrypted content is added to a full text index via indexing module 124. In addition, the decrypted content can be exported as evidence in legal cases and leveraged to render a preview of the encrypted e-mail message.

The present invention embodiments may be applied to other data sources and/or systems employing encryption and decryption, or other protections for data. For example, operating system components may encrypt data (e.g., files, file system, etc.) and present invention embodiments may be utilized to decrypt that data via user and/or operating system credentials in substantially the same manner described above (e.g., an agent module of a client system may process decryption requests and transparently (or with user permission) decrypt the data using the corresponding operating system credentials). Further, the e-mail messages or other data may include one or more access restrictions (e.g., password protection, user permissions/access restrictions, access control list (ACL), etc.), and present invention embodiments may utilize end-user credentials or other information within the e-mail or other systems to transparently (or with user permission) access the protected content and provide an unprotected version. Thus, present invention embodiments enable access to content of protected data (e.g., encrypted or encoded, password protected, access restricted, etc.) without knowledge of the information needed to provide the content (e.g., keys, passwords, etc.).

Present invention embodiments may further enable access to content of protected documents (e.g., encrypted or encoded, password protected, access restrictions (e.g., ACL, etc), etc.) for archiving. This is accomplished without storing keys and passwords, but guaranteeing the integrity of the resulting data. For example, present invention embodiments may provide access to a document (e.g., .pdf, .zip or other file) that may be password protected by an application without knowledge of the password. Further, present invention embodiments may provide decryption of an encrypted document without knowledge of the encryption/decryption keys.

An access server system offers a sandbox (e.g., a remote session or virtual desktop with limited capabilities) to a client system of a user that has appropriate information to provide access to a protected document in order to access the document content. This sandbox is automatically configured with the protected document and is presented to the user through a tightly controlled interface (e.g., a limited remote desktop session). The interface allows the user to provide the necessary credentials (e.g., a password needed by the native application (e.g. IBM Symphony for an .odt text document, etc.)) to the application installed in the sandbox to open and/or decrypt the protected document. In addition, the interface presents a read-only view of the document to the user for validation of the document contents.

The only active operation the user can perform within the sandbox is to submit the appropriate information (e.g., password, decryption credentials, etc.) to access the protected document. All other operations are blocked, and the user is limited to read only access. Since the document is hosted on the access server system, no content or document transfer to the client system or workstation of the user is required, and the content of the document cannot be altered. This guarantees that the resulting version of the document contains the same content as the original protected version of the document.

Since the sandbox is based on a remote session, it is not running locally on a client system, but rather, directly on the access server system. Thus, the sandbox can be provided to internal users of an entity (e.g., corporation, company, organization, etc.) as well as external users (e.g., a user already left the entity, the document was encrypted by a customer and keys are not internally available, etc.).

Once the document content has been accessed (e.g., opened, decrypted, etc.) in the sandbox, the sandbox notifies an archiving system about the access. The archiving system reprocesses the unprotected document content (e.g., archiving, indexing, etc.), and any unprotected content is removed automatically from the sandbox and the sandbox is subsequently destroyed.

Based on a system configuration, an administrator or other user can decide when the access process should be initiated (e.g., before initial archiving or anytime after archiving). Since protected archived documents are flagged in the archive and in the archive index, a search system can search for and return a number of protected documents when the access process is performed after initial archiving.

Figure 3:
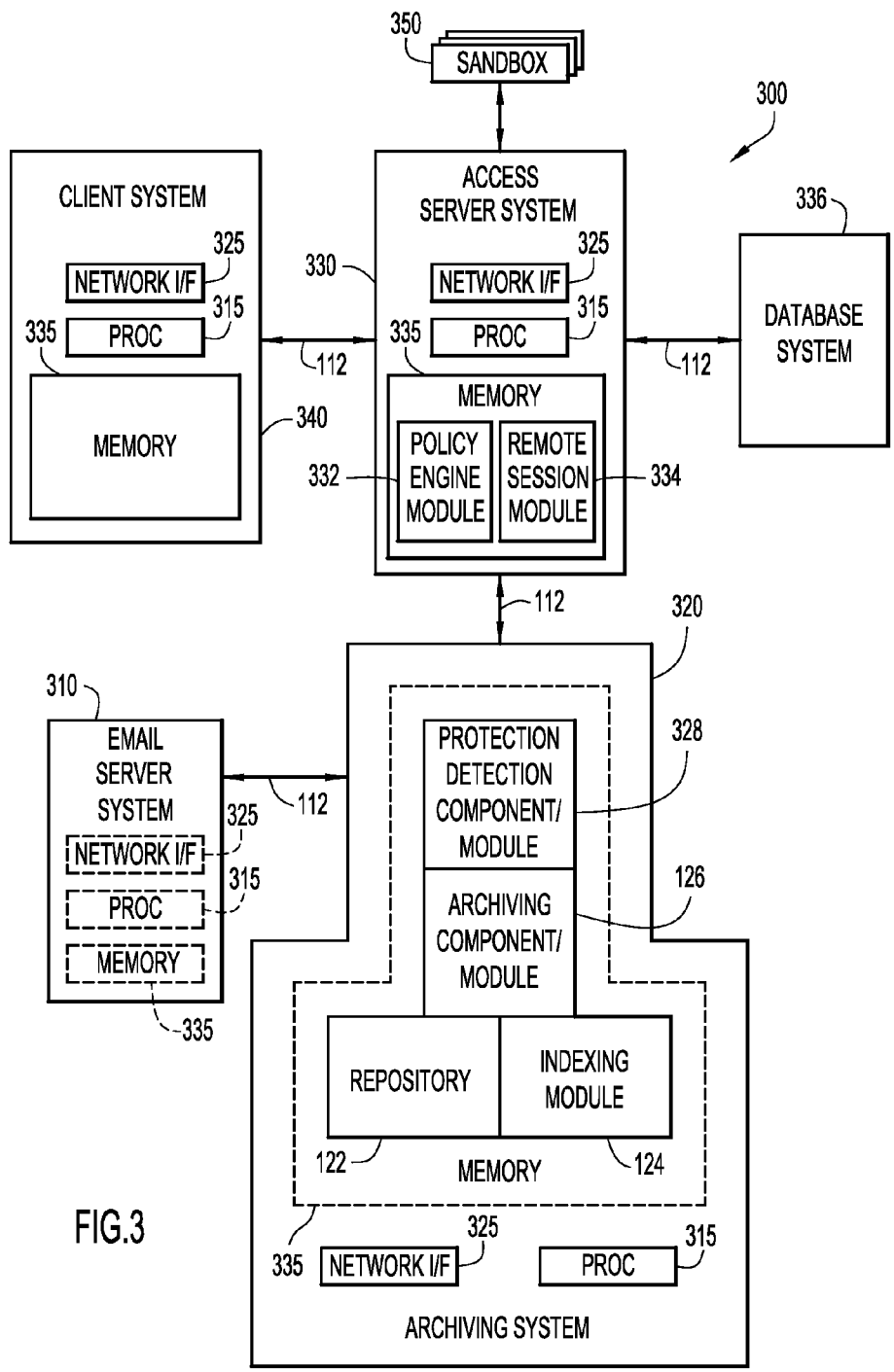
FIG. 3 is a diagrammatic illustration of an example computing environment of an embodiment of the present invention for archiving protected documents.

An example computing environment for a present invention embodiment that accesses content of protected documents for archiving is illustrated in FIG. 3. Specifically, computing environment 300 includes one or more data sources 310, an archiving system 320, an access server system 330, and one or more client or end-user systems 340. Data sources 310, archiving system 320, access server system 330, and client systems 340 may be remote from each other and communicate over connections of a network 112. The network may be implemented by any number of any suitable communications media (e.g., wide area network (WAN), local area network (LAN), Internet, Intranet, etc.). Alternatively, data sources 310, archiving system 320, access server system 330, and/or client systems 340 may be local to each other, and communicate via any appropriate local communication medium (e.g., local area network (LAN), hardwire, wireless link, Intranet, etc.).

Data sources 310 may be implemented by any conventional or other storage structures or systems (e.g., server systems, databases, e-mail systems, file systems, etc.) that contain documents (e.g., pages, files, or any other structures that contain data). Archiving system 320 archives or stores documents from data sources 310. The archiving system includes repository 122 to store the documents, indexing module 124 to generate an index for the stored documents to perform searching, and archiving component or module 126 to control archiving of the documents in repository 122, each substantially similar to the corresponding components described above. Archiving system 320 further includes a protection detection component or module 328 to determine the presence of protected documents. Repository 122 may be implemented by any conventional or other database or storage unit, may be local to or remote from archiving system 320, and may communicate via any appropriate communication medium (e.g., local area network (LAN), wide area network (WAN), Internet, hardwire, wireless link, Intranet, etc.).

Access server system 330 includes a policy engine module 332 to determine users to receive a request for accessing content of a protected document detected by archiving system 320. The access server system further includes a remote session module 334 to provide a sandbox or limited remote desktop session 350 for an owner or originator of the protected document to facilitate access to contents of the protected document. A database system 336 may store various information for the determination (e.g., rules, constraints, additional information (e.g., directories, organizational charts, etc.)). The database system may be implemented by any conventional or other database or storage unit, may be local to or remote from access server system 330, and may communicate via any appropriate communication medium (e.g., local area network (LAN), wide area network (WAN), Internet, hardwire, wireless link, Intranet, etc.).

Client systems 340 may present a graphical user (e.g., GUI, etc.) or other interface (e.g., command line prompts, menu screens, etc.) to provide sandbox 350 and solicit information from users pertaining to access of the contents of a protected document. Once the contents of the protected document are accessed, the access server system sends the content to archiving system 320 for archiving.

Data sources 310, archiving system 320, access server system 330, and client systems 340 may be implemented by any conventional or other computer systems preferably equipped with a display or monitor, a base (e.g., including at least one processor 315, one or more memories 335 and/or internal or external network interfaces or communications devices 325 (e.g., modem, network cards, etc.)), optional input devices (e.g., a keyboard, mouse or other input device), and any commercially available and custom software (e.g., server/communications software, browser/interface software, policy engine module, remote session module, protection detection component or module, archiving component or module, indexing module, etc.).

The modules (e.g., policy engine module, remote session module, protection detection component or module, archiving component or module, indexing module, etc.) of computing environment 300 may include one or more modules or units to perform the various functions of present invention embodiments described below. These various modules (e.g., policy engine module, remote session module, protection detection component or module, archiving component or module, indexing module, etc.) may be implemented by any combination of any quantity of software and/or hardware modules or units, and may reside within memory 335 of the server, archiving and/or client systems for execution by corresponding processor 315.

Figure 4:
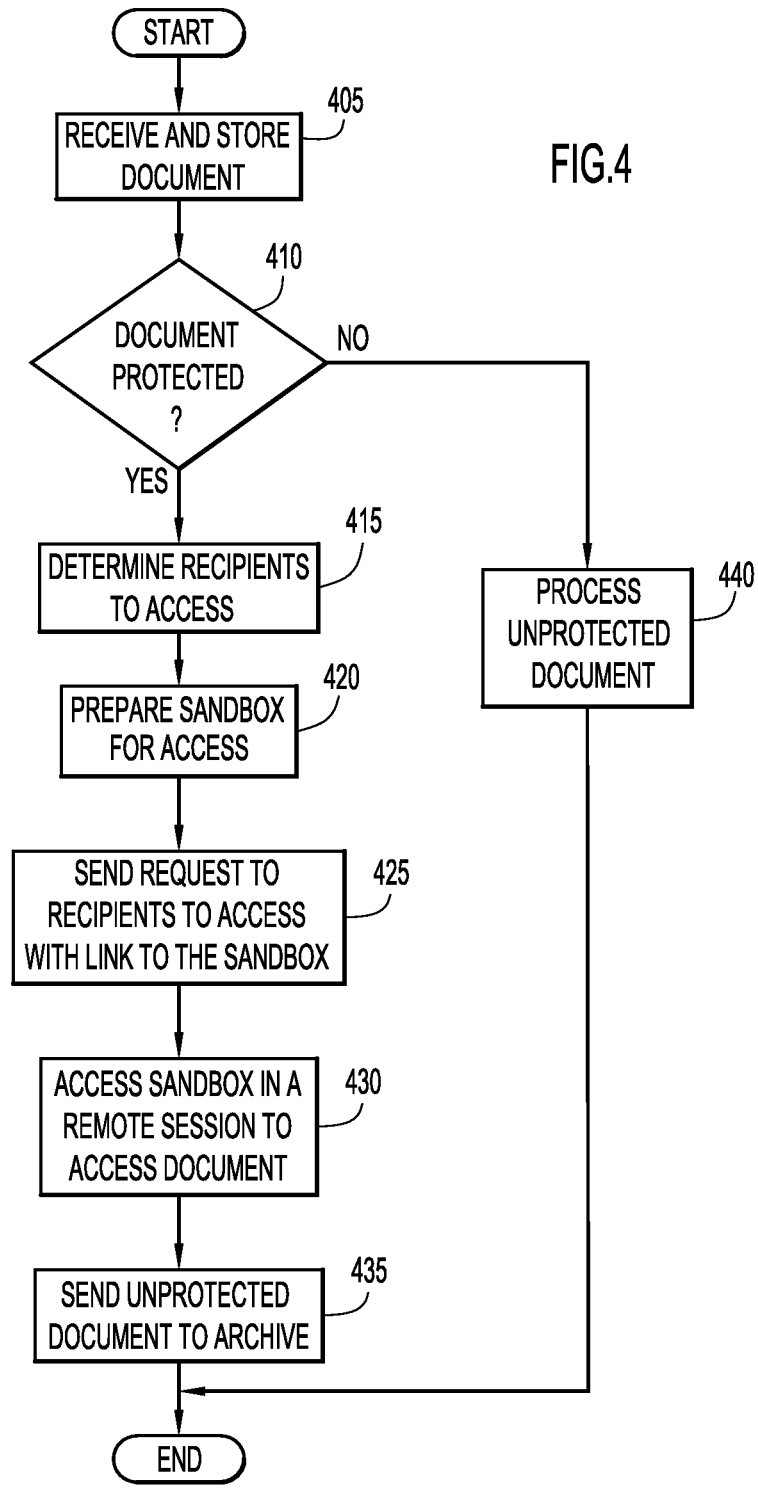
FIG. 4 is a procedural flow chart illustrating a manner of accessing content of a protected document for archiving that content according to an embodiment of the present invention.

A manner of archiving protected documents (e.g., via archiving system 320, access server system 330, and client systems 340 and their corresponding modules) is illustrated in FIG. 4. Specifically, a document from data source 310 is received by archiving system 320 at step 405. The archiving system archives or stores (e.g., via archiving component 126) the received document in repository 122 (e.g., regardless of the presence of protection). This enables a protected document to be stored in a protected original form to ensure that the original document is always archived successfully in its entirety. The protected document may be searched based on metadata (e.g., the owner or originator information) provided by the data source. Alternatively, the document may be archived after a determination (e.g., by protection detection component 328 of archiving system 320) of the presence of a protected document at step 410.

Protection detection component 328 of archiving system 320 examines the received document for the presence of protective measures (e.g., password protection, encryption or encoding, access restrictions, etc.) at step 410. For example, the protection detection component may include a conventional or other tool to detect the presence of a protected document. Alternatively, the protection detection component may examine the file format or content of the document for comparison against a standard to determine the presence of a protected document, in addition, data source 310 may set a flag within a document to indicate that the document is protected (e.g., password or other protection, encrypted or encoded, etc.). The protection detection component may examine the state of this flag within the received document to determine the presence of a protected document.

When the document is not protected as determined at step 410, the unprotected document is processed and indexed at step 440 (e.g., via indexing component 124 and/or archiving component 126 of archiving system 320) to enable keyword or content searching of the document.

When the document is protected as determined at step 410, a request is sent from the protection detection component 328 of archiving system 320 to access server system 330 to determine one or more users able to access the contents of the protected document at step 415. The request may include various information pertaining to the document (e.g., the owner or originator of the document, document identifier, user with access rights (or within an ACL), sender and/or recipients of the document in case of an e-mail or document transfer, etc.).

Policy engine module 332 of the access server system determines the users able to access the contents of the protected document. For example, the policy engine module may analyze document metadata (if available) to identify potential users capable of accessing the content of the protected document. The access server system may further include additional information for use in determining the users (e.g., organizational structure, corporate or other directory, etc). Moreover, the policy engine module may utilize rules, statistics and/or external data sources (e.g., a directory service, etc.) to determine a strategy to use for generating access requests that are sent to specific users. For example, constraints or rules may include excluding external users (e.g., users external of an entity (e.g., corporation, company, organization, etc.)) from the access process; excluding users which are unavailable (e.g., due to vacation, sickness or other configurable reason according to their calendar) from the access process; generating another access request for a different user when the initial user does not respond to an access request within a certain time interval (e.g., days, etc.); and generating access requests for two or more users in the same or different departments or groups of an entity (e.g., corporation, company, organization, etc.) and comparing resulting documents.

The access server system (e.g., via remote session module 334) further prepares a sandbox 350 for presentation to determined users at step 420 based on the protected document content from repository 122. The sandbox provides a virtual desktop to client systems of the determined users with the application needed to access contents of the protected document. The creation of the sandbox can be achieved, by way of example, using virtual machines and templates (e.g., VMWare virtual machines (VM) and VMWare templates). For example, in order to create a sandbox for accessing a password protected .pdf document, an administrator or other user creates a new virtual machine with an operating system and software (e.g., ACROBAT READER) installed to open the protected document. This virtual machine is stored as a template to be reusable for this document type. The administrator or other user creates a template for various document types to be encountered by the archiving system. The access server system instantiates the template corresponding to the document type of the protected document received by the archiving system. When a template does not exist for a document type of a protected document, the access server system may notify the administrator or other user to provide a template corresponding to that document type.

The virtual machine further contains software to control interaction commands and rules with the sandbox. The administrator or other user further defines a set of approved commands and rules that a client system is able to execute within the sandbox (e.g., the client system cannot close/restart applications, etc.). The rules may be entered via a rules editor of access server system 330. In addition, the administrator or other user can record some user interactions or steps, where the recording is played when the client system accesses the sandbox. The recording stops when user input is required, and continues upon receiving the input. The client system is not allowed to perform any actions within the sandbox other than watching the recording and providing input at specific steps (e.g., a password prompt, etc.).

Once the sandbox is instantiated and the users to receive the access request have been determined, the access request is generated and sent from access server system 330 to client systems 340 of the determined users at step 425. The access server system automatically sends the access requests to the determined users, or queues the tasks for an administrator or other user that sends the access requests to the determined users (if no automatic determination of users is possible). The access request may be of any form and include various information to access the sandbox. For example, the access request may be in the form of an e-mail message with a link or Uniform Resource Locator (URL) to access the sandbox.

In order to ensure that the document is accessed even if a particular user is not available (e.g. the user is out of the office, the client system is not reachable, etc.), the access request can be sent to plural users serially or in parallel (e.g., the owners or originators, users with access rights, etc.), and one or more of the users may be required to respond to the access request as described below.

The determined users receive the access request on client systems 340, typically including a notification requesting access to some protected documents and a link or URL to the sandbox. A determined user actuates the link (or otherwise utilizes the URL in a browser or other application) at step 430 to access the sandbox on access server system 330 in a remote session that allows the user to provide information (e.g., password, decryption key, etc.) to access (e.g., open, decrypt, etc.) the protected document. The sandbox basically provides a remote virtual desktop (e.g., WINDOWS or other desktop) on the client system with limited capabilities.

In particular, upon being accessed by a user on a client system, the access server system (e.g., via remote session module 334) retrieves the protected document from repository 122. (e.g., via the document identifier), uses the virtual machine template for the protected document to run an image to provide the sandbox or virtual desktop on that client system, and applies the protected document to the virtual machine. Various scripts may launch the sandbox with an application based on the document type. When the protected document is being opened by the appropriate application executing in the sandbox, a request is presented by the application to the user in order to obtain the required information (e.g., password, decryption keys, etc.) for the application to unprotect the document (e.g., open, decrypt, etc.) and access the document content. The virtual machine status is presented to the client system in response to accessing the sandbox. The rules prevent the client system from performing any modifications to the document or other operations within the application.

Integrity of the unprotected document within the sandbox is ensured by preventing actions by the client system within the sandbox that modify the unprotected document. Specifically, when the user interacts with the sandbox using the remote session, commands received by the sandbox from the client system (e.g., Remote Desktop Protocol (RDP) commands) are filtered by the access server system (e.g., via remote session module 334) to allow only approved commands to be processed and executed within the sandbox. The approved commands are configured by an administrator or other user during creation of the sandbox as described above, and may differ between different sandbox content (e.g., may differ between sandboxes of different document types).

The filtering may include explicit filtering (e.g., prevent specific keystrokes (e.g., filter tab, etc.), prevent specific mouse moves (e.g., the cursor cannot leave or enter an area, etc,)) and implicit filtering (e.g., detect if the focus moves to a different window, detect if the remote session is in an invalid state (e.g., an error pop-up window is presented and gains focus, etc.)). The remote session module intercepts communication between the client system and access server system, where each command (describing an action to perform) from the user during the remote session is evaluated against the approved commands and/or one or more sets of rules. The rules are configured by an administrator or other user during creation of the sandbox as described above, and may differ between different sandbox content (e.g., may differ between sandboxes of different document types).

By way of example, the rules may include: basic rules (e.g., prevent focus change); and/or application specific rules (e.g., prevent application specific commands (e.g., not allow editing of text content of a text document)). Only allowed commands (e.g., commands that have not been filtered) are processed and executed within the sandbox (e.g., a user can only enter a password and hit enter, a user cannot change focus or edit the data, etc.), thereby preserving the integrity of an unprotected document. If a constraint violation is detected (e.g., an unpermitted command is executed), the remote session is terminated since the filtering has presumably been bypassed.

Alternatively, the recording of user interactions or steps created by the administrator or other user may be played when the client system accesses the sandbox. The recording stops when user input is required, and continues upon receiving the input. The client system is not allowed to perform any actions within the sandbox other than watching the recording and providing input at specific steps (e.g., a password or key prompt, etc) via filtering of commands in substantially the same manner described above.

Once the appropriate information has been provided by a user to the application within the sandbox, the application unprotects (e.g., opens, decrypts, etc.) the document, and access server system 330 sends the unprotected document to archiving system 330 at step 435. The archiving system processes the unprotected document (e.g., via indexing component 124 and/or archiving component 126) at step 437. In order to protect the decrypted content, the access server system may encrypt the unprotected content based on credentials of the archiving system. In this case, the archiving system utilizes the credentials to decrypt the encrypted content to retrieve the document contents.

The access request can be sent to a single user for a response (e.g., unprotected document), or to a plurality of users serially or in parallel, where one or more of the plurality of users may be required to respond to the access request. In the case of plural users receiving the access request, a first received response may be sufficient to provide the unprotected document. Alternatively, the unprotected document from two or more of the plural users may be compared to verify the document, where the unprotected document may be selected from the version provided by any quantity of the plural users (e.g., a majority, at least a certain quantity, etc.). If an access request is not responded to from a sufficient quantity of the contacted users during a configurable time period (or the document cannot be verified), the protected document may be flagged in the archive (or repository 122) with a corresponding status flag in order to allow for additional processing (e.g., resend the access request, determine other users, etc.).

At this point, the archiving system is responsible for, and has to ensure the security of the unprotected document. Accordingly, the archiving system may encrypt the unprotected document with its own security mechanism (e.g., via any conventional or other encryption/decryption techniques), and/or provide access restrictions (e.g., an access control list (ACL)). Further, an implicit or explicit link between the archived protected document and the unprotected document is established in the archiving system to preserve the relation between alternative representations. In addition, the archiving system indexes the unprotected document (e.g., via indexing module 124) to enable the protected document to be searchable (e.g., for eDiscovery, etc.).

During the indexing, the unprotected content may be flagged with a delta index to enable only authorized users to access this unprotected content.

The received document may further contain one or more protected documents therein (e.g., e-mail messages may contain protected and/or unprotected attachments (e.g., .zip files may contain extracted .pdf files, etc.)). Further, the contained documents may similarly contain one or more protected documents (e.g., an e-mail message containing another e-mail message with one or more protected documents, etc.) to provide one or more nested levels of protected and/or unprotected documents. Protection detection component 328 of archiving system 330 detects the presence of one or more protected documents within these nested levels, where each protected document is processed to access and archive content of that protected document (e.g., via the sandbox) in substantially the same manner described above. Unprotected documents contained within the nested levels are simply processed (e.g., indexing and storage) by the archiving system in order to be archived in repository 122 in substantially the same manner described above.

It will be appreciated that the embodiments described above and illustrated in the drawings represent only a few of the many ways of implementing embodiments for accessing protected content for archiving.

The environments of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The data sources may be implemented by any suitable data storage structures or systems by themselves, or in combination with one or more computer systems. The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, agent module, policy engine module, remote session module, encryption detection component or module, protection detection component or module, archiving component or module, indexing module, rules editor, etc.). These systems may include any types of monitors and input devices (e.g., keyboard, mouse, voice recognition, etc.) to enter and/or view information.

It is to be understood that the software (e.g., agent module, policy engine module, remote session module, encryption detection component or module, protection detection component or module, archiving component or module, indexing module, etc) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc). For example, the functions of the present invention embodiments may be distributed in any manner among the various end-user/client, archiving and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., agent module, policy engine module, remote session module, encryption detection component or module, protection detection component or module, archiving component or module, indexing module, etc.) may be available on a non-transitory computer readable or useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any cumber of any conventional or other databases, data stores or storage structures (e.g., files, databases, data structures, data or other repositories, etc.) to serve as the data sources, repository and database system and store information (e.g., archived documents, policies, rules, original documents, entity information, etc.). The database system and repository may be implemented by any number of any conventional or other databases, data stores or storage structures (e.g., files, databases, data structures, data or other repositories, etc.) to store information (e.g., policies, rules, archived documents, entity information, etc.). The database system may be included within or coupled to the server, archiving, and/or client systems. The database systems and/or storage structures may be remote from or local to the computer or other processing systems, and may store any desired data (e.g., policies, rules, entity information, etc.).

The documents may be of any form (e.g., file, data structure, page, e-mail or other message, etc.) and format (e.g., .pdf, text or multimedia document, .zip, etc.) and include any quantity of any desired information. The document may include any quantity of protected documents in any quantity of nested levels. The protected document may be contained within the document content, as an attachment to the document, or associated with the document in any fashion (e.g., a link or reference to a contained document, etc.). The presence of protective measures may be determined in any manner (e.g., flags, comparison of content/format to a reference, a tool, etc). The various flags (e.g., encryption/protection, permission denied, insufficient or unverified response, etc.) may be of any form and include any information to indicate a state.

Present invention embodiments may be applied to any conventional or other type of e-mail systems and archiving systems that archive any desired data. Further, present invention embodiments may be utilized to access protected content of any suitable data items for any desired operations or systems. The content may be protected in any of one or more manners (e.g., encrypted or encoded, password protected, access restrictions, etc.), where the archiving or other system does not have knowledge of the complete information to access the protected content. For example, the archiving or other system may have no knowledge, or knowledge of any portion, of the information (e.g., password, encryption/decryption keys, etc.) needed to access the protected content (e.g., of a document, e-mail or other message, file, etc.).

The rules may be of any quantity, type or format, and may include any quantity and/or combination of constraints to determine any quantity of users (and/or systems) for decrypting e-mails or other messages, or accessing content of protected documents. Further, any suitable statistical or other techniques (alone or in combination with the rules) may be applied to determine the users (and/or systems). The various requests (e.g., request to decryption/access server system, access request, decryption request, etc.) may be of any format and include any desired information. The requests (e.g., to the decryption and access servers) may include any document or message identifiers and/or include the entire or any portion of the message or document. The identifiers may include any information to identify the protected message or document. The access request may include any desired identifier to enable access of the sandbox (e.g., URL, link, pointer, etc.).

The access and decryption requests may be sent to a single user, or to a plurality of users in any fashion (e.g., serially, in parallel, etc.). Further, any quantity of users/client systems may be required to respond to the access and decryption requests. In the case of plural users receiving the access or decryption request, a first received response may be sufficient. Alternatively, the resulting documents or e-mail messages from the plural users may be compared for verification, where the resulting unprotected document or decrypted e-mail message may be selected from the version provided by any quantity of the plural users (e.g., a majority, at least a certain quantity, etc.).

Any type of user interface (e.g., Graphical User Interface (GUI), command-line, prompt, etc.) may be employed for obtaining user or other permission to access protected content, where the interface may include any information arranged in any fashion. Further, the agent module may be pre-configured to automatically access an encrypted or otherwise protected e-mail message (without requesting user permission), or check a parameter (e.g., configurable by the user or system) indicating a permission requirement prior to accessing protected content. Permission may be requested based on any suitable rules or conditions.

The sandbox may be implemented by any type of user interface (e.g., Graphical User Interface (GUI), command-line, prompt, remote desktop, etc.) for obtaining or providing information (e.g., password, decryption keys, etc.), where the interface may include any information arranged in any fashion. The sandbox may initiate any application capable of accessing content of a protected document. The sandbox templates may be of any quantity, type or format, and may be associated with a document based on any document properties (e.g., type, etc.). The operations enabled within the sandbox or other interface may be limited in any desired fashion. Any directives for actions (e.g., commands, instructions, key strokes, peripheral motion or input, etc.) may be filtered or otherwise processed based on any desired information (e.g., approved command or operation lists, etc.) to limit operations performed within the sandbox or other interface. Further, rules may be employed to limit operations within the sandbox. The rules may be of any quantity, type or format, and may include any quantity and/or combination of constraints. The rules may be used alone or in combination with the filtering.

The present invention embodiments may employ any number of any type of user interface (e.g., Graphical User Interface (GUI), command-line, prompt, etc.) for obtaining information to access protected content (e.g., user permission, password, decryption keys, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized by any systems (e.g., e-mail, archiving, processing, communications, etc.) for accessing content protected in any manner, where at least a portion of the information required to access the protected content is known external of those systems by a user and/or other system (e.g., e-mail system, sender/recipient of a message/file, originator or owner of a document/file, etc.). Present invention embodiments may be combined in any fashion to handle various combinations of protected documents. For example, an encrypted e-mail message may include a protected document as an attachment. In this example case, the e-mail content may be decrypted by a present invention embodiment in cooperation with an e-mail system as described above, while the protected attachment may be accessed by a present invention embodiment employing a sandbox or other interface as described above.

The terminology used herein is for the purpose of describing particular embodiments only and is not intended to be limiting of the invention. As used herein, the singular forms "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for accessing protected content comprising:
   an archiving system with a hardware processor configured to archive documents, the archiving system having an encryption detection component that is configured to:
      determine a presence of protection for a received encrypted document;
      send a request to a decryption server system to determine one or more users able to decrypt the encrypted document;
      wherein the decryption server system is configured to send a decryption request to agent modules of one or more client system computing devices to identify one or more users associated with information required to access content of the received protected document based on a set of rules that provide permission to decrypt the encrypted document, the agent modules are configured to decrypt the encrypted document to provide a decrypted document;
      wherein the archiving system is further configured to generate a protected document by encrypting the decrypted document to ensure security of decrypted document content,
      wherein the archiving system is further configured to archive the protected document
   a link between said archived protected document and said encrypted document;
   wherein a first of the one or more said computing devices is configured to generate an access request to obtain the content of the received protected document from the archiving system, wherein the request is transmitted through a secure interface to a second of the one or more said computing devices to retrieve and utilize the required information to access the content of the received protected document; and
   wherein the archiving system is configured to allow utilization of the decrypted document content within a remote session of a secure virtual desktop, wherein the remote session of the secure virtual desktop that allows the identified one or more users to access the link between the archived protected document and the encrypted document allows the one or more users to access the decrypted document content.

2. The computer system of claim 1, wherein the protected document is protected via at least one of encryption and password protection.

3. The computer system of claim 1, wherein the first of the one or more said computing devices is further configured to send the access request to a plurality of users of the identified one or more users for permission to access the content of the protected document, whereby one or more of the client systems associated with the plurality of users is required to respond to the access request.

4. The computer system of claim 1, wherein the first of the one or more said computing devices is further configured to receive via the secure interface the required information from a determined user and utilize the received information to access the content of the protected document.

5. The computer system of claim 4, wherein the secure interface is a secure virtual desktop with an application that requests and utilizes the required information to access the content of the protected document.

6. The system of claim 1, wherein the access request is sent to each of the at least two users in parallel.

7. The system of claim 1, wherein the access request is serially sent to each of at least two users.

8. A non-transitory computer program product for accessing protected content comprising:
   a non-transitory computer readable storage medium having computer readable program code embodied therewith, the computer readable program code comprising computer readable program code for a first computing device configured to:
      receive a notification from an archiving system, the archiving system having an encryption detection component that determines a presence of protection for a document received by the archiving system;
      receive a request at a decryption server system from the encryption detection component to determine one or more users able to decrypt the encrypted document;
      transmit a decryption request from the decryption server system to agent modules of one or more client system computing devices to identify at least users associated with information required to access the content of the protected document based on a set of rules that provide permission to decrypt the encrypted document, wherein the agent modules are configured to decrypt the encrypted document to provide a decrypted document;
      generate a protected document generated by encrypting the decrypted document to ensure security of decrypted document content;
      archive the protected document within the archiving system;
      generate a link between said archived protected document and said encrypted document;
      send an access request to at least one second computing device associated with the at least two determined users, the request being received by each of the at least two users to retrieve and utilize the required information to access the content of the protected document; and
      allow access via a remote session of the secure virtual desk to the link between said archived protected document and said encrypted document to allow access to the decrypted document content for utilizing the decrypted document content within the remote session of the secure virtual desktop,
   wherein the protected document is protected via at least one of encryption and password protection.

9. The computer program product claim 8, wherein the computer readable program code further comprises computer readable program code for the at least one second computing device configured to: request permission to access the content of the protected document from an associated determined user and access the content in response to obtaining the permission.

10. The computer program product of claim 8, wherein the computer readable program code for the first computing device further comprises computer readable program code configured to: provide an interface to receive the required information from a determined user and utilize the received information to access the content of the protected document.

11. The computer program product of claim 10, wherein the interface is a virtual desktop with an application that requests and utilizes the required information to access the content of the protected document.

12. The computer program product of claim 11, wherein the computer readable program code for the first computing device further comprises computer readable program code configured to: limit operations on the virtual desktop to prevent modification of the accessed content.

13. The computer program product claim 8, wherein the computer readable program code for the first computing device further comprises computer readable program code configured to:

send the request to each of the at least two users in parallel.

14. The computer program product claim 8, wherein the computer readable program code for the first computing device further comprises computer readable program code configured to:

serially send the request to each of the at least two users.

15. A computer-implemented method of accessing protected content comprising:

providing an archiving system having an encryption detection component;

examining a document received at the archiving system;

using the encryption detection component to determine presence of an encryption of the document;

upon detection of the encryption of the document, sending a request from the encryption detection component to a decryption server system to determine one or more users able to decrypt the encrypted document;

receiving a decryption request transmitted from the decryption server system to agent modules of the client systems to identify one or more users having permission to decrypt the encrypted document;

decrypting the encrypted document by the agent modules;

transmitting the decrypted document from the agent modules to the archiving system;

generating a protected document by encrypting the decrypted document within the archiving system to ensure security of decrypted document content, and archiving said protected document;

providing a link between said archived protected document and said encrypted document;

sending to said identified one or more users permission to decrypt a request through a secure virtual desktop to access the decrypted document content of said decrypted document;

wherein at least one of said identified one or more users accessing the link through a remote session of the secure virtual desktop is allowed to access the decrypted document content of said decrypted document; and utilizing the decrypted document content within the remote session of the secure virtual desktop.

16. The computer-implemented method of claim 15 wherein the protected document is an e-mail message sent from an e-mail server system to the archiving system, the method further comprising:

examining by an encryption detection component the received e-mail message to determine presence of an encryption of the e-mail message;

sending the request from the encryption detection component to the decryption server system to determine one or more users able to decrypt the encrypted e-mail message;

transmitting the decryption request from the decryption server system to client systems of the determined one or more users;

receiving the decryption request at agent modules of the client systems to identify the one or more users having permission to decrypt the encrypted e-mail message;

decrypting the encrypted e-mail message by the agent modules using credentials of said identified users having permission to decrypt the encrypted e-mail message;

transmitting the decrypted e-mail message from the agent modules to the archiving system;

generating a protected e-mail message by encrypting the decrypted e-mail message by the archiving system to ensure security of decrypted content;

archiving the protected e-mail message by the archiving system;

providing in the archiving system a link between said archived protected e-mail message and said decrypted e-mail message;

sending to said identified one or more users permission to decrypt a request through a secure virtual desktop to access the decrypted content of said decrypted e-mail message;

at least one of said identified users accessing the link through a remote session of the secure virtual desktop to access the decrypted content of said decrypted e-mail message; and utilizing the decrypted content of said decrypted e-mail message within the remote session of the secure virtual desktop.

17. The computer-implemented method of claim 16 further including filtering user interactions within the remote session of the secure virtual desktop by allowing only approved commands to ensure the integrity of and prevent modification to the decrypted content of said decrypted e-mail message.

18. The computer-implemented method of claim 16 wherein an application running in the remote session of the secure virtual desktop unprotects said decrypted e-mail message to access the decrypted content thereof.

19. The computer-implemented method of claim 16 wherein the access request is sent to a single user of the identified one or more users to access the decrypted content of said decrypted e-mail message within the remote session of the secure virtual desktop.

20. The computer-implemented method of claim 16 wherein the access request is sent to a plurality of users of the identified one or more users to access the decrypted content of said decrypted e-mail message, whereby one or more of the client systems associated with the plurality of users is required to respond to the decryption request.

* * * * *